July 11, 1967 R. WICK 3,330,460
FILM TRANSPORTING DEVICE
Filed July 27, 1965
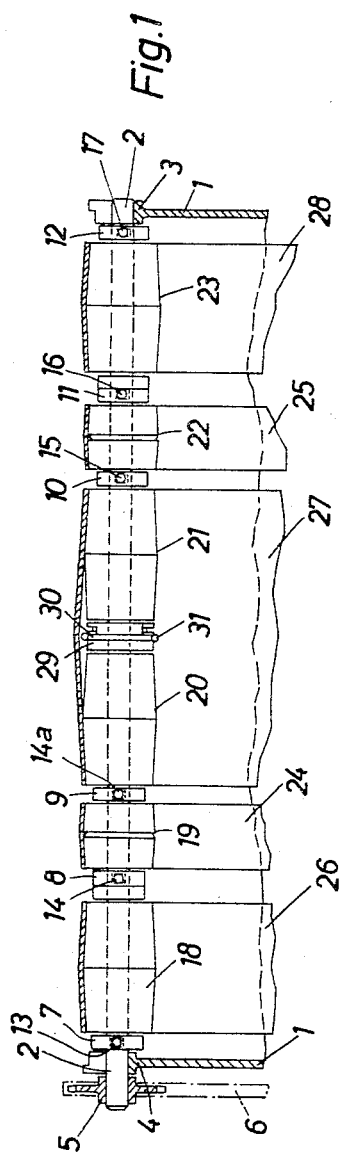
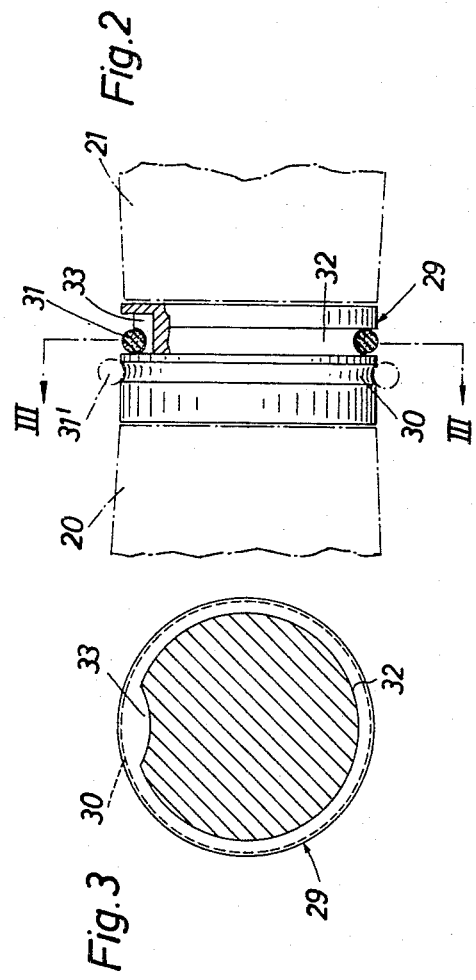
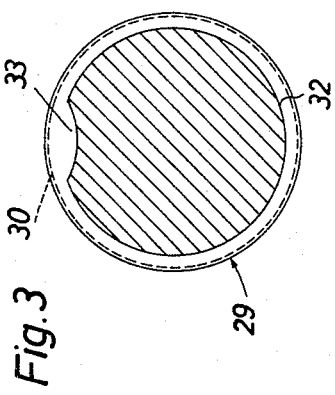
INVENTOR:
RICHARD WICK
BY Michael S. Striker
ATTORNEY

United States Patent Office 3,330,460
Patented July 11, 1967

3,330,460
FILM TRANSPORTING DEVICE
Richard Wick, Grunwald, near Munich, Germany, assignor to Agfa-Gevaert Aktiengesellschaft, Leverkusen, Germany
Filed July 27, 1965, Ser. No. 475,166
Claims priority, application Germany, Aug. 8, 1964, A 46,799
13 Claims. (Cl. 226—175)

ABSTRACT OF THE DISCLOSURE

A transporting device for strands of sensitized photographic material, comprising a shaft, a pair of strand rollers mounted coaxially on this shaft, and an annular crown. This annular crown is disposed intermediate the strand rollers and movable axially with reference to the shaft between two positions.

---

The present invention relates to a transporting device for strands of sensitised photographic material, such as roll film or sensitised paper. More particularly, the invention relates to an improved device which is especially suited for transporting strands of sensitised photographic material through one or more processing solutions in a developing apparatus.

It is already known to provide a film- or paper-transporting device with substantially barrel shaped strand rollers whose median portions engage and guide the central portions of strands. A serious drawback of many presently used transporting devices is that each of their rollers can advance only one type of strand, i.e., a strand of certain width. Thus, whenever it becomes necessary to transport strands of different width, the transporting device must be taken apart and reassembled with different strand rollers or the entire device must be replaced by a different transporting device. As a rule, the width of a strand should not exceed the axial length of the roller on which the strand is guided.

It is also known to place between a pair of adjoining barrel shaped strand rollers a permanently installed rigid crown whose diameter exceeds the major diameters of the strand rollers and which may guide the central portion of a relatively wide strand. A serious drawback of such transporting devices is that, when the strand rollers are used to guide relatively narrow strands, the strands are likely to be displaced laterally and move into engagement with the centrally located rigid crown or actually climb onto the crown which results in damage to sensitized material and in eventual destruction of strands.

Accordingly, it is an important object of the present invention to provide a convertible transporting device whose components are constructed, assembled and mounted in such a way that they can readily guide relatively narrow and/or relatively wide strands of sensitized photographic material and which can be readily converted for use with narrow or wide strands without necessitating even partial dismantling of its components.

Another object of the invention is to provide a transporting device of the just outlined characteristics wherein the conversion from use with wide strands to use with narrow strands can be carried out without resorting to any tools.

A further object of the invention is to provide a transporting device which may properly guide one or more relatively wide strands and one or more relatively narrow strands, which can guide only narrow strands or only wide strands, or wherein the guides for each wide strand may be converted into twice the number of guides for narrow strands.

An additional object of the invention is to provide a film transporting device which may embody a series of driven strand rollers or a series of idler rollers.

Still another object of the invention is to provide a novel crown which may be used in a transporting device for strands of roll film or sensitized paper.

A concomitant object of the invention is to provide a novel method of rapidly converting a transporting device from use with relatively narrow strands to use with relatively wide strands, or vice versa.

Briefly stated, one feature of my present invention resides in the provision of a transporting device for strands of sensitized photographic material, such as film or paper. The transporting device comprises a shaft, a pair of axially spaced barrel shaped strand rollers mounted on and rotatable with or relative to the shaft, and an annular crown disposed intermediate the rollers and movable with reference to the shaft between a first and a second position in which its maximum diameter respectively exceeds and at most equals the major diameters of the rollers. A relatively wide strand of sensitized material may be guided by the crown when the latter assumes the first position, and each strand roller may guide a relatively narrow strand when the crown is moved to its second position.

In its presently preferred form, the transporting device comprises a ring which is located between the strand rollers and is provided with a relatively shallow and also with a relatively deep circumferential groove. The crown consists of a highly elastic corrosion-resistant elastomeric material of such thickness that its maximum diameter exceeds the major diameters of the strand rollers when it is received in the shallow groove. If the crown is moved into the deeper groove, it contracts sufficiently to move its maximum-diameter portion within the confines of the strand rollers. In other words, the crown can be sunk or concealed in the deeper groove. The ring subjects the crown to radial expanding stresses, at least when the crown extends into the shallow groove.

Of course, the shaft may support one or more additional strand rollers and one or more additional crowns, depending on the desired capacity of the transporting device.

The novel features which are considered as characteristic of the invention are set forth in particular in the appended claims. The improved transporting device itself, however, both as to its construction and its mode of operation, together with additional features and advantages thereof, will be best understood upon perusal of the following detailed description of a specific embodiment with reference to the accompanying drawings, in which:

FIG. 1 is a side elevational view of the transporting device;

FIG. 2 is an enlarged partly elevational and partly sectional view of a detail of the transporting device shown in FIG. 1; and FIG. 3 is a transverse section as seen in the direction of arrows from the line III—III of FIG. 2.

Referring to the drawings in detail, the numeral 1 denotes the housing of a processing machine, for example, a tank which contains a processing solution for elongated strands 26, 27, 28 of sensitized photographic material in the form of paper or roll film. The housing 1 comprises upwardly extending side walls which carry aligned bearings 3, 4 for a horizontal drive shaft 2. One end of the shaft 2 is connected with a sprocket 5 which is driven by an endless chain 6 shown by phantom lines. That portion of the shaft 2 which extends between the side walls of the housing 1 carries a series of annular spacers or distancing elements 7, 8, 9, 10, 11 and 12 which are respectively secured to the shaft by radial screws 13, 14, 14a, 15, 16 and 17. These spacers are disposed between a series of substantially barrel shaped strand rollers 18, 20, 21, 23 and two substantially barrel shaped pulleys 19, 22. The pulley 19 is mounted between the strand rollers 18, 20, and the pulley 22 is mounted between the strand rollers 21, 23. Each pulley and each strand roller is coaxially fixed to and rotates with the shaft 2.

Two endless transporting belts 24, 25 are respectively trained around the pulleys 19, 22 and their function is to entrain the strands 26, 27 and 28 so that such strands will respectively travel over rollers 18, 20–21 and 23. As stated before, each strand roller resembles a barrel, i.e., the diameter of its median portion is the major diameter and exceeds slightly the diameters of its end portions so that the median portions of the rollers 18, 23 respectively engage and guide the central portions of the strands 26 and 28. The connections between the belts 24, 25 and the strands 26, 27, 28 comprise suitable clamps of known design, not shown, which are readily detachable from the strands and compel them to share the movement of the belts and to pass through the processing solution which is located at a level below the shaft 2. Only the leading ends of the strands are connected with the belts 24, 25; the major portions of the strands are guided by the median portions of the respective strand rollers.

In accordance with an important feature of my invention, the shaft 2 supports a short ring 29 which is located between the axially spaced centrally disposed strand rollers 20 and 21. The ring 29 has a truly cylindrical peripheral surface whose diameter at most equals the minor diameters of the strand rollers 20, 21 and this peripheral surface is provided with two axially spaced circumferential grooves 30, 32. The groove 30 is relatively shallow and the groove 32 is relatively deep. Each of these grooves may accommodate an annular crown 31 which preferably consists of highly elastic corrosion-resistant elastomeric material and is subjected to at least some radical expansion, particularly when it extends into the shallow groove 30. The thickness of the crown 31 is such that, when it extends into the shallow groove 30 to assume the phantom-line position 31' of FIG. 2, its maximum diameter exceeds the major diameters of the strand rollers 20, 21 so that a relatively wide strand 27 engages the crown with its centrally located portion while the edge portions of the strand 27 overlie the adjoining strand rollers 20, 21. When the crown 31 is moved radially and axially with reference to the shaft 2 and strand rollers 20, 21 to extend into the deeper groove 32, its maximum diameter at most equals but is preferably less than the major diameters of the rollers 20, 21 so that each of these rollers may guide a relatively narrow strand of sensitized photographic material, such as the strands 26, 28 which are respectively guided by the outer strand rollers 18, 23.

It will be seen that, when the crown 31 is moved to the phantom-line position 31' of FIG. 2, it constitutes with the rollers 20, 21 a relatively wide strand roller which is capable of properly guiding a strand 27 whose width exceeds considerably the width of a narrow strand 26 or 28 and whose maximum width normally does not considerably exceed the combined axial length of the rollers 20, 21.

If the diameter of the ring 29 equals the minor diameters of the strand rollers 20, 21, the depth of the groove 32 preferably equals the thickness of the crown 31 but may be somewhat less, as long as the maximum-diameter portion of the crown does not extend beyond the median portions of the strand rollers. As stated before, when the crown 31 extends into the groove 32, each of the strand rollers 20, 21 may guide a separate strand of sensitized material.

The deeper groove 32 is preferably provided with a portion 33 whose depth (see FIG. 3) and/or width (see FIG. 2) exceeds the depth or width of the remainder thereof. The portion 33 facilitates engagement of the crown 31 by fingers or by the tip of a simple tool in order to transfer the crown into the shallower groove 30. There is no need for any such deeper portion in the groove 30 because, in the phantom-line position 31' of FIG. 2, the crown extends well beyond the peripheral surface of the ring 29 and can be easily rolled back into the deeper groove 32.

It is further clear that the ring 29 and crown 31 may be used with equal advantage in transporting devices wherein the shaft 2 is held against rotation and supports a series of idler strand rollers which rotate with respect thereto in response to advance of the belts 24, 25 which may be driven by pulleys mounted on another shaft.

In speaking of corrosion-resistant elastomeric material, I wish to state that the crown 31 consists of rubber or elastic plastic which can withstand the chemical action of processing solutions of the type needed for treatment of sensitized photographic material. Also, the crown should be sufficiently elastic and wear-resistant to withstand repeated and frequent shifting from the groove 30 into the groove 32, or vice versa. The surface of the crown 31 is preferably smooth to avoid damage to conveyed strands. It is well known that, when wet, such strands offer very little resistance to stretching, scratching and other sorts of deformation or damage. Preferably the crown 31 consists of silicone-rubber.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. In a transporting device for strands of sensitized photographic material, a shaft; a pair of strand rollers coaxially mounted on said shaft; and an annular crown disposed intermediate said rollers, said crown being movable axially with reference to said shaft between a first position and a second position in which its maximum diameter respectively exceeds and at most equals the diameters of said rollers.

2. In a transporting device for strands of sensitized photographic material, a shaft; a pair of identical strand rollers coaxially mounted on said shaft, each of said rollers having a larger-diameter median portion; and an annular crown disposed intermediate said rollers, said crown being movable axially with reference to said shaft between a first and a second position in which its maximum diameter respectively exceeds and is less than the diameters of said median portions.

3. In a transporting device for strands of sensitized photographic material, a shaft; a pair of identical strand rollers coaxially mounted on said shaft, each of said rollers having a large-diameter median portion; and an annular crown disposed intermediate said rollers, said crown being movable axially and radially with reference to said shaft between a first and a second position in which its maximum diameter respectively exceeds and is less than the diameters of said median portions.

4. In a transporting device for strands of sensitized photographic material, a shaft; a pair of identical strand rollers coaxially mounted on said shaft, said rollers being spaced from each other and each thereof having a larger-diameter median portion; a ring disposed between said rollers and having an outer diameter which is less than the diameters of said median portions, said ring being provided with a relatively shallow first circumferential groove and with a relavitely deep second circumferential groove; and an annular crown of elastically deformable material surrounding said ring, said crown being movable between a first position in said first groove in which its maximum diameter exceeds the diameters of said median portions and a second position in said second groove in which its maximum diameter at most equals the diameters of said median portions.

5. In a transporting device for strands of sensitized photographic material, a shaft; a pair of identical strand rollers coaxially mounted on said shaft, said rollers being spaced from each other and each thereof having a larger-diameter median portion; a ring disposed between said rollers and having an outer diameter which is less than the diameters of said median portions, said ring being provided with a shallow circumferential groove; and an annular crown of elastically deformable material surrounding said ring, said crown being movable between a first position in said groove in which its maximum diameter exceeds the diameters of said median portions and a second position in which its maximum diameter at most equals the diameters of said median portions.

6. In a transporting device for strands of sensitized photographic material, a shaft; a pair of identical strand rollers coaxially mounted on said shaft, said rollers being spaced from each other and each thereof having a larger-diameter median portion; a ring disposed between said rollers and having an outer diameter which is less than the diameters of said median portions, said ring being provided with a relatively shallow first circumferential groove and with a relatively deep second circumferential groove; and an annular crown of highly elastic corrosion-resistant elastomeric material surrounding said ring, said crown being movable between a first position in said first groove in which its maximum diameter exceeds the diameters of said median portions and a second position in said second groove in which its maximum diameter at most equals the diameters of said median portions.

7. In a transporting device for strands of sensitized photographic material, a shaft; a pair of identical strand rollers coaxially mounted on said shaft, said rollers being spaced from each other and each thereof having a larger-diameter median portion; a ring disposed between said rollers and having an outer diameter which is less than the diameters of said median portions, said ring being provided with a relatively shallow first circumferential groove and with a relatively deep second circumferential groove, said second groove having a portion whose width exceeds the width of the remainder thereof; and an annular crown of elastically deformable material surrounding said ring, said crown being movable between a first position in said first groove in which its maximum diameter exceeds the diameters of said median portions and a second position in said second groove in which its maximum diameter at most equals the diameters of said median portions.

8. In a transporting device for strands of sensitized photographic material, a shaft; a pair of identical strand rollers coaxially mounted on said shaft, said rollers being spaced from each other and each thereof having a larger-diameter median portion; a ring disposed between said rollers and having an outer diameter which is less than the diameters of said median portions, said ring being provided with a relatively shallow first circumferential groove and with a relatively deep second circumferential groove, said second groove having a portion whose depth exceeds the depth of the remainder thereof; and an annular crown of elastically deformable material surrounding said ring, said crown being movable between a first position in said first groove in which its maximum diameter exceeds the diameters of said median portions and a second position in said second groove in which its maximum diameter at most equals the diameters of said median portions.

9. In a transporting device for strands of sensitized photographic material, a shaft; a pair of axially spaced substantially barrel-shaped strand rollers coaxially mounted on said shaft; and an annular crown disposed intermediate said rollers, said crown being movable radially and axially with reference to said shaft between a first position and a second position in which its maximum diameter respectively exceeds and at most equals the major diameters of said rollers.

10. In a transporting device for strands of sensitized photographic material, a shaft; a pair of strand rollers coaxially mounted on said shaft; and an annular crown disposed intermediate said rollers, said crown being movable with reference to said shaft between a first position and a second position in which its maximum diameter respectively exceeds and at most equals the diameters of said rollers, said crown consisting of elastomeric material and being expanded radially, at least in said first position thereof.

11. In a convertible transporting device for relatively wide and relatively narrow strands of sensitized photographic material, a rotary shaft; a pair of axially spaced barrel-shaped strand rollers coaxially mounted on and rotatable with said shaft; and an annular crown disposed intermediate said rollers, said crown being movable with reference to said shaft between a first and a second position in which its maximum diameter respectively exceeds and at most equals the major diameters of said rollers whereby, in said first position thereof, said crown may guide the central portion of a relatively wide strand whose marginal portions overlie said rollers, each of said rollers being adapted to guide a portion of a relatively narrow strand when the crown is moved to said second position.

12. In a transporting device for strands of sensitized photographic material, a rotary shaft; a pair of strand rollers coaxially mounted on and rotatable with said shaft; and an annular crown disposed intermediate said rollers, said crown being movable axially with reference to said shaft between a first position and a second position in which its maximum diameter respectively exceeds and at most equals the diameters of said rollers.

13. In a transporting device for strands of sensitized photographic material, a rotary shaft; a drive for said shaft; a pair of identical strand rollers coaxially mounted on and rotatable with said shaft, said rollers being spaced from each other and each thereof having a larger-diameter median portion; a ring disposed between said rollers and having an outer diameter which is less than the diameters of said median portions, said ring being provided with a relatively shallow first circumferential groove and with a relatively deep second circumferential groove; an annular crown of elastically deformable material surrounding said ring, said crown being movable between a first position in said first groove in which its maximum diameter exceeds the diameters of said median portions and a second position in said second groove in which its maximum diameter at most equals the diameters of said median portions; a pulley outwardly adjacent to each of said rollers and fixed to said shaft; and a belt trained around each of said pulleys.

References Cited
UNITED STATES PATENTS

| | | | |
|---|---|---|---|
| 2,644,384 | 7/1953 | Forgett | 226—190 |
| 2,777,330 | 1/1957 | Barclay | 29—121 |
| 3,245,594 | 4/1966 | Pendleton | 226—190 |

M. HENSON WOOD, Jr., *Primary Examiner.*

J. N. ERLICH, *Assistant Examiner.*